United States Patent
Juan et al.

(10) Patent No.: US 9,866,444 B2
(45) Date of Patent: *Jan. 9, 2018

(54) DYNAMIC CONVERSION OF HARDWARE RESOURCES OF A SERVER SYSTEM

(71) Applicant: International Business Machines Corporation, Armonk, NY (US)

(72) Inventors: Ya-Huey Juan, San Jose, CA (US); Brian C. Kraemer, Elk Grove, CA (US); Michael N. Nguyen, San Jose, CA (US); Jing Peng, Shanghai (CN); Tracy N. Waller, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 12 days.

This patent is subject to a terminal disclaimer.

(21) Appl. No.: 15/018,903

(22) Filed: Feb. 9, 2016

(65) Prior Publication Data

US 2016/0156525 A1 Jun. 2, 2016

Related U.S. Application Data

(63) Continuation of application No. 14/074,104, filed on Nov. 7, 2013, now Pat. No. 9,306,805.

(51) Int. Cl.
*G06F 15/177* (2006.01)
*H04L 12/24* (2006.01)
(Continued)

(52) U.S. Cl.
CPC .......... *H04L 41/145* (2013.01); *H04L 41/082* (2013.01); *H04L 41/0869* (2013.01);
(Continued)

(58) Field of Classification Search
CPC . H04L 41/082; H04L 41/145; H04L 41/0806; H04L 41/0893; H04L 41/0803;
(Continued)

(56) References Cited

U.S. PATENT DOCUMENTS

7,334,225 B2   2/2008  Boonie et al.
7,797,404 B1   9/2010  Knight
(Continued)

*Primary Examiner* — Jungwon Chang
(74) *Attorney, Agent, or Firm* — Scott S. Dobson (57) ABSTRACT

Embodiments herein provide for a method of dynamically converting servers and a computer and storage readable medium configured to do the same. In the method a first server enters a server conversion while a second server performs one or more network services. A current physical hardware configuration and logical hardware configuration of a first server and a second server is verified. Possible conversions are calculated of one or more valid logical hardware configurations and one or more valid physical hardware configurations based on the current hardware configurations of the first server and the second server. A valid physical hardware configuration is selected for both servers from the calculated possible conversions. The physical hardware is updated for the conversion of the physical hardware configuration of the first server. The current logical configuration of the first server converts to a valid logical hardware configuration based on the calculated possible conversions.

19 Claims, 4 Drawing Sheets

(51) Int. Cl.
　　　*H04L 29/08*　　　(2006.01)
　　　*H04L 12/751*　　(2013.01)
　　　*G06F 9/445*　　 (2006.01)

(52) U.S. Cl.
　　　CPC ............... *H04L 67/10* (2013.01); *G06F 8/65* (2013.01); *G06F 15/177* (2013.01); *H04L 41/0803* (2013.01); *H04L 41/0806* (2013.01); *H04L 41/0863* (2013.01); *H04L 41/0893* (2013.01); *H04L 45/02* (2013.01); *H04L 67/141* (2013.01)

(58) Field of Classification Search
　　　CPC ............. H04L 41/0863; H04L 41/0869; H04L 67/141; H04L 67/10; H04L 45/02; G06F 8/65; G06F 8/68; G06F 11/1464; G06F 9/5011; G06F 15/177; G06Q 10/087
　　　USPC ................ 709/220, 230, 223, 221; 711/113; 717/168; 705/28; 713/2, 100
　　　See application file for complete search history.

(56) References Cited

U.S. PATENT DOCUMENTS

| | | | |
|---|---|---|---|
| 7,814,495 | B1 | 10/2010 | Lim et al. |
| 8,375,380 | B2 | 2/2013 | Shahidzadeh et al. |
| 9,032,053 | B2 | 5/2015 | Kosuru et al. |
| 9,306,805 | B2* | 4/2016 | Juan ...................... H04L 41/145 |
| 2003/0120914 | A1 | 6/2003 | Axnix et al. |
| 2003/0229890 | A1* | 12/2003 | Lau .......................... G06F 8/65 717/168 |
| 2004/0034577 | A1* | 2/2004 | Van Hoose .......... G06Q 10/087 705/28 |
| 2004/0215748 | A1* | 10/2004 | Boonie .................. G06F 9/5011 709/220 |
| 2006/0041881 | A1* | 2/2006 | Adkasthala ............... G06F 8/68 717/168 |
| 2010/0153638 | A1* | 6/2010 | Yochai ................ G06F 11/1464 711/113 |
| 2013/0326053 | A1 | 12/2013 | Bauer et al. |
| 2014/0007072 | A1 | 1/2014 | Chhabra |
| 2015/0020050 | A1 | 1/2015 | Dain |
| 2015/0127784 | A1 | 5/2015 | Juan et al. |

* cited by examiner

DYNAMIC CONVERSION OF HARDWARE RESOURCES OF A SERVER SYSTEM

FIELD

The present invention generally relates to a group of servers with a compatible hardware configuration making up a server system, and more specifically, to a dynamic conversion of hardware resources of the server system.

BACKGROUND

A server is a system of software and computer hardware that responds to requests across a computer network to provide a network service. A server may be on a dedicated computer or the server may be on a host computer. The server may perform a task for a client computer system. The server may serve many client computer systems. If a server fails, then the client computer systems may no longer receive the service the server provides. Many server systems include a group of servers with compatible hardware configurations that may resume services of a main server if the main server were to fail.

SUMMARY

Embodiments herein provide for a method of dynamically converting servers on a server system and a computer and storage readable medium configured to do the same. In the method, a first server enters a server conversion while a second server performs one or more network services. A current physical hardware configuration and logical hardware configuration of a first server and a second server is verified. Possible conversions are calculated of one or more valid logical hardware configurations and one or more valid physical hardware configurations based on the current hardware configurations of the first server and the second server. A valid physical hardware configuration is selected for both servers from the calculated possible conversions. The physical hardware is updated for the conversion of the physical hardware configuration of the first server. The current logical configuration of the first server converts to a valid logical hardware configuration based on the calculated possible conversions.

BRIEF DESCRIPTION OF THE DRAWINGS

Embodiments are illustrated by way of example, and not by way of limitation, in the figures of the accompanying drawings in which reference numerals refer to similar elements.

DETAILED DESCRIPTION

Embodiments herein provide for a system and method of converting hardware on a group of servers with a compatible hardware configuration of a server system. Features illustrated in the drawings are not necessarily drawn to scale. Descriptions of well-known components and processing techniques are omitted so as to not unnecessarily obscure the disclosed embodiments. The descriptions of embodiments are provided by way of example only, and are not intended to limit the scope of the invention as claimed. The same numbers may be used in the Figures and the Detailed Description to refer to the same devices, parts, components, steps, operations, and the like.

A server system, such as a data storage system, may have two or more servers for supporting the server system. Multiple servers may be used to create redundancy and back up capability if a primary server fails. Periodically, the servers may need to change or convert their hardware resources, such as an upgrade or downgrade of certain hardware resources. The conversion of hardware resources may require adding or removing various types of memory such as cache and RAM and adding more computer processing units. The conversion may need to take place while the server system is providing services and performing I/O functions. Therefore, there can be no downtime to the server system. Having no downtime and providing the server system services are uninterrupted requires that the conversion not take place on one of the servers to keep the server system running without any data loss or access loss.

Furthermore, during the server system conversion there may be restrictions that all of the running servers cannot have a big mismatch in their hardware resources. For instance, if there is a very large mismatch of cache configuration among servers, then that may create unstable cache operations that may impact the overall server system. This may require that each server conversion must stop at a specific hardware configuration check point before reaching a desired hardware configuration. The remaining servers may then be converted to the specific configuration before the server conversion may continue to a desired hardware configuration. This may be repeated several times depending on the size of the conversion from the original hardware configuration to the desired hardware configuration. This requires multiple physical hardware installations for each configuration check point so as not to create a mismatch, which is time consuming.

In an example, two servers may make up the server system and each server may have 4 processor cores and 64 GB of cache. The server administrator may want the servers to be upgraded to 16 processor cores and 512 GB of cache. However, the server system may only allow the conversion of a first server to reach 8 processor cores and 128 GB of cache before there is too high of mismatch between the first server and the second server. The second server may still be providing network services while the first server is being converted. After the first server conversion, then the conversion may switch over to the second server to convert that server to 8 processors cores and 128 GB of cache before the first server can again convert to a higher level. Each of these gradual steps may require additional physical hardware to be installed to avoid too high of mismatch between the two servers.

Embodiments herein provide for a conversion application that dynamically converts the logical hardware configuration of a group of servers with a compatible hardware configuration of a server system. The conversion application allows for all of the physical hardware resources to be installed at once to avoid multiple hardware resource installations. Furthermore, embodiments may allow the conversion to be retried from the previous logical hardware configurations provided the conversion fails.

Figure 1:
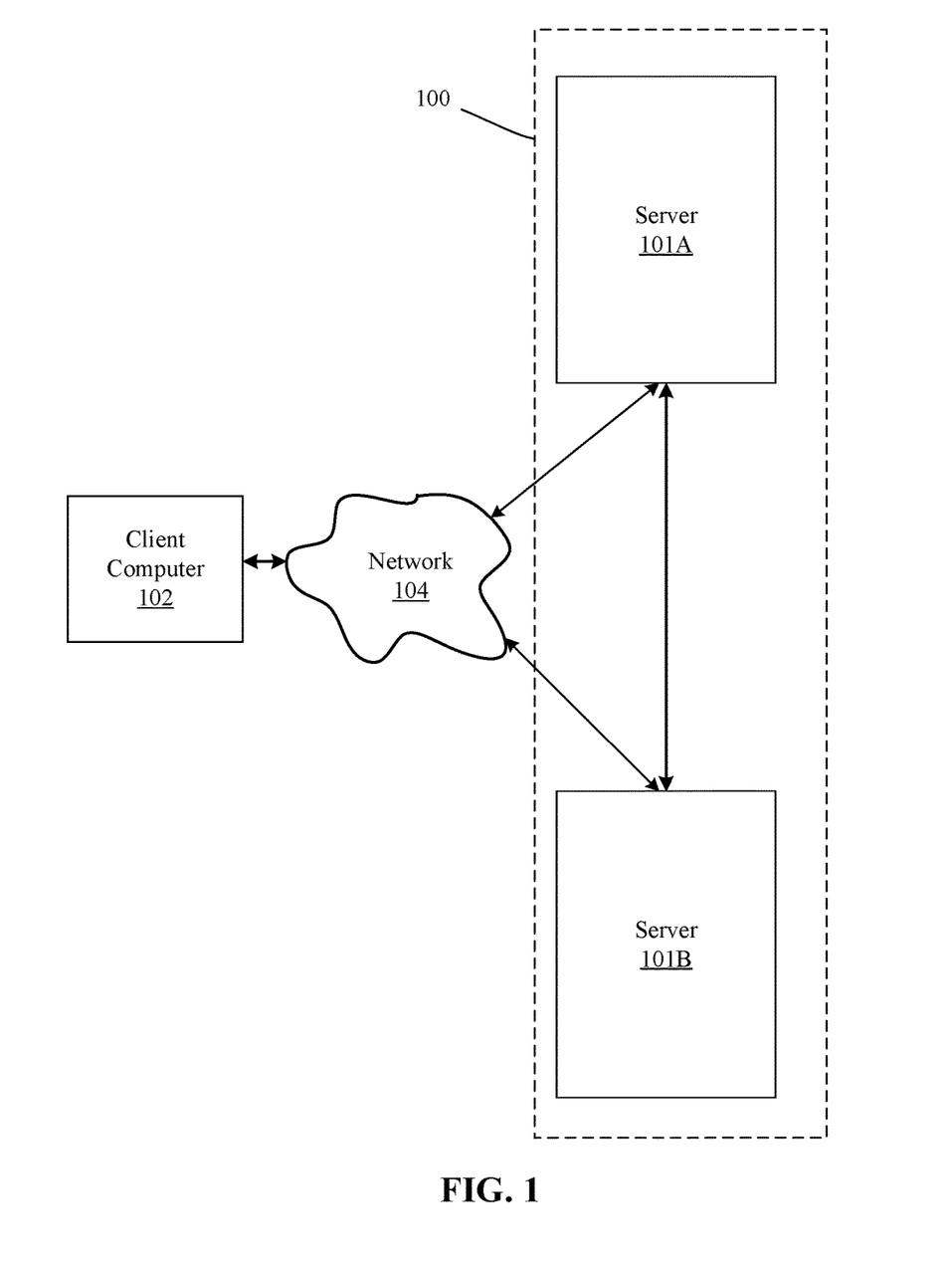
FIG. 1 depicts a high-level block diagram of an exemplary server system for implementing an embodiment.

FIG. 1 illustrates an exemplary server system 100 on which a dynamic conversion application may convert the server system 100 to different hardware resources. The server system 100 may include a plurality of server computer systems (generally referred to herein as servers 101) in communication with a network 104 a client computer system 102. In the example illustrated in FIG. 1, the server system 100 may include a first server 101A and a second server 101B that may be in communication with each other. The first server 101A and the second server 101B may also each be in communication with the network 104 through a switch, node, or router for example. The client computer system 102 may also be in communication with the servers 101 through the network 104.

The first server 101A and second server 101B may be a group of servers with a compatible hardware configuration. Each server may provide the same service in such a way that the service will still be available if one of the servers fails. One of the servers may be the primary, local server while the other server may be a secondary, peer server. There may be additional secondary, peer servers, in various embodiments. Further descriptions of the servers 101, client computer system 102, and network 104 will be provided below.

During a hardware conversion of the servers, i.e., hardware upgrade of servers, the conversion may begin on the first server 101A. The second server 101B may continue to provide network services to the network 104. An allowed physical hardware configuration may be installed on the first server. A conversion application may convert a logical hardware configuration to an acceptable level where there is allowable mismatch between the first server 101A logical hardware configuration and the second server 101B logical hardware configuration. After the first server is brought online and updated with the data from the second server 101B so that the servers 101 are redundant, then the conversion may begin with server 101B while the first server 101A is providing services to the network 104. The physical hardware configuration of the second server 101B may be converted to that of the first server 101A. The conversion application may convert the logical hardware configuration of the second server 101B to that of the first server 101A or to a logical hardware configuration with acceptable mismatch between the two servers. The second server may then be updated with the data of the first server 101A and brought back online. This can be repeated between the two servers until the desired logical hardware configuration is met or if the logical hardware configuration reaches the physical hardware installation. This allows a server system conversion to occur without having to change the physical hardware configuration at each logical configuration checkpoint.

Figure 2:
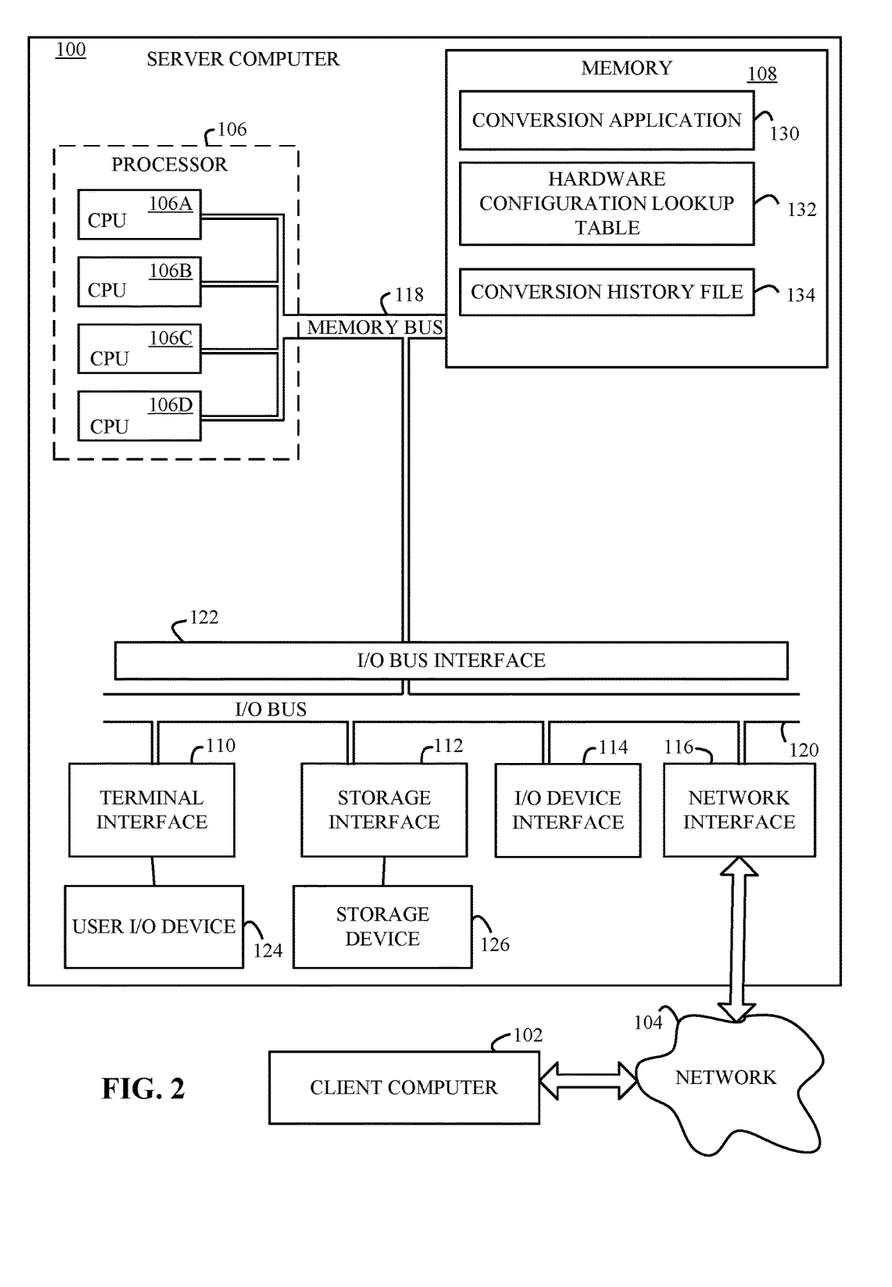
FIG. 2 depicts a high-level block diagram of an exemplary server computer system for implementing an embodiment.

Referring to the drawings, FIG. 2 depicts a high-level block diagram representation of the server computer system 101 connected to a client computer system 102 via a network 104, according to an embodiment. The terms "server" and "client" are used herein for convenience only, and in various embodiments a computer system that operates as a client computer in one environment may operate as a server computer in another environment, and vice versa. The mechanisms and apparatus of embodiments apply equally to any appropriate computing system, including a computer system that does not employ the client-server model.

The major components of the server 101 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The server 101 may contain one or more general-purpose programmable central processing units (CPUs) 106A, 106B, 106C, and 106D, herein generically referred to as the processor 106. In an embodiment, the server 101 may contain multiple processors typical of a relatively large system; however, in another embodiment the server 101 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the server 101, and may also include the virtual memory of other computer systems coupled to the server 101 or connected via the network 104. The main memory 108 may be conceptually a single monolithic entity, but in other embodiments the main memory 108 may be a more complex arrangement, such as a hierarchy of caches and other memory devices.

The main memory 108 may store or encode a conversion application 130, a hardware configuration lookup table 132, and a conversion history file 134. Although the conversion application 130, a hardware configuration lookup table 132, and a conversion history file 134 are illustrated as being contained within the memory 108 in the server 101, in other embodiments some or all of them may be on different computer systems and may be accessed remotely, e.g., via the network 104. The server 101 may use virtual addressing mechanisms that allow the programs of the server 101 to behave as if they only have access to a large, single storage entity instead of access to multiple, smaller storage entities. Thus, while the conversion application 130, a hardware configuration lookup table 132, and a conversion history file 134 are illustrated as being contained within the main memory 108, these elements are not necessarily completely contained in the same storage device at the same time. Further, although the conversion application 130, a hardware configuration lookup table 132, and a conversion history file 134 are illustrated as being separate entities, in other embodiments some of them, portions of some of them, or all of them may be packaged together.

In an embodiment, the conversion application 130, a hardware configuration lookup table 132, and a conversion history file 134 may include instructions or statements that execute on the processor 106 or instructions or statements that may be interpreted by instructions or statements that execute on the processor 106, to carry out the functions as further described below with reference to FIGS. 3A and 3B. In another embodiment, the conversion application 130, a hardware configuration lookup table 132, and a conversion history file 134, or two or more of these elements may be implemented in hardware via semiconductor devices, chips, logical gates, circuits, circuit cards, other physical hardware devices, or a combination of these devices in lieu of, or in addition to, a processor-based system. In an embodiment, the conversion application 130, a hardware configuration lookup table 132, and a conversion history file 134, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the server 101, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the server 101 to other digital devices and computer systems 102; such paths may include, e.g., one or more networks 104.

In various embodiments, the server 101 may be a multi-user mainframe computer system, a single-user system, or a server computer or similar device that has little or no direct user interface, but receives requests from other computer systems (clients). In other embodiments, the server 101 may be implemented as a desktop computer, portable computer, laptop or notebook computer, tablet computer, pocket computer, telephone, smart phone, or any other appropriate type of electronic device.

The client computer system 102 may include some or all of the hardware and/or computer program elements of the server 101. The various program components implementing various embodiments may be implemented in a number of manners, including using various computer applications, routines, components, programs, objects, modules, data structures, etc., and are referred to herein as "computer programs," or simply "programs."

Figure 3A:
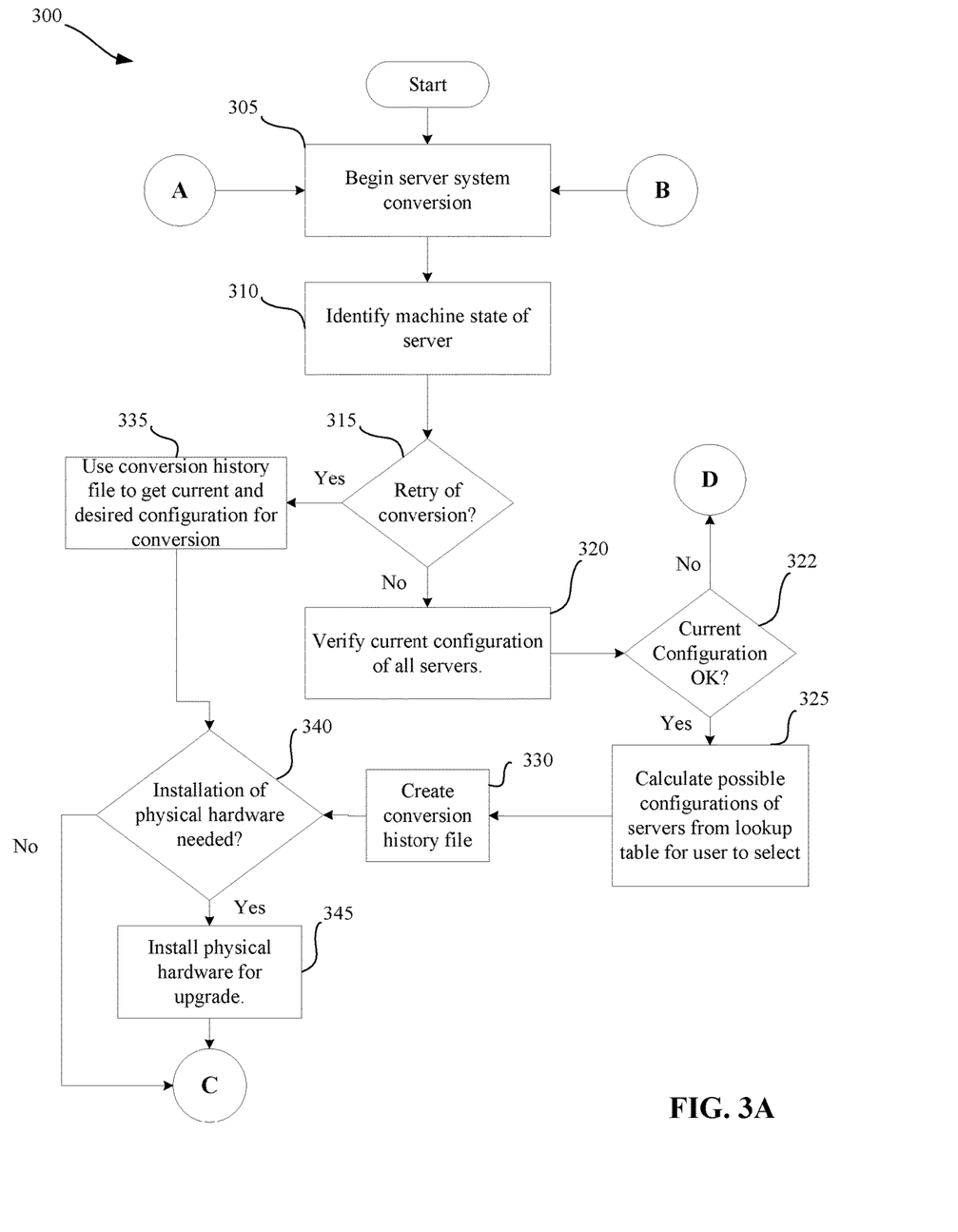
FIG. 3A depicts a flowchart of a method of converting one or more hardware resources of a server system, according to an embodiment FIG. 3B further depicts the flowchart of FIG. 3A of the method of converting one or more hardware resources of the server system, according to an embodiment.

FIG. 3A illustrates a flow chart of a method 300 for conversion of a server system such as server system 100 of FIG. 1, according to an embodiment. Two or more servers such as servers 101A and 101B of FIG. 1 may require a hardware conversion. In operation 305, the conversion application 130 may be initiated on one of the servers. For exemplary purposes, the conversion application 130 may be initiated for the first server 101A. However, in other embodiments the conversion application 130 may first initiate on the second server 101B or on multiple servers as long as one server provides network services. Also for exemplary purposes, the conversion may be an upgrade of hardware to from the servers having an initial physical and logical hardware configuration of 4 processor cores and 64 GB of cache to the servers having 16 processor cores and 512 GB of cache.

In operation 310, the conversion application 130 may identify a machine state of the server. The conversion application 130 may identify whether the server is entering conversion for the first time or whether the conversion is a retry of a previous conversion attempt that failed.

In operation 315, the conversion application 130 may determine the machine state of the first server 101A. If the server conversion is not a retry of a server conversion, then method 300 may continue to operation 320. In operation 320, the conversion application 130 may verify the current physical hardware configuration and logical hardware configuration of all of the servers in the server system 100, i.e., 4 processor cores and 64 GB of cache. The physical hardware configuration refers the resources of the tangible devices installed on the system. The logical hardware configuration refers to what physical resources of the physical hardware the server is actually using, which may be less than the physical resources of the physical hardware.

In operation 322, if the current configuration does not allow the server to be converted, then the method may continue at operation 355 of FIG. 3B by returning an error, which is further explained below. If the local server has reached its pre-defined upper hardware configuration limit, then it cannot upgrade its physical hardware capacity further and has to wait until other servers upgrade their hardware capacity to be within a compatible level. In operation 322, if the current configuration of the server is good, then the method may continue to operation 325 of method 300.

In operation 325, the conversion application 130 may calculate from the hardware configuration lookup table 132 of FIG. 2 all possible physical and logical hardware configurations that may be selected from to obtain a desired physical and logical hardware configuration. The desired physical and logical hardware configuration may be selected in operation 325, i.e., 16 processor cores and 512 GB of cache.

The hardware configuration lookup table 132 may be an array of possible hardware configurations for the server system 100. The hardware configuration lookup table 132 may include, but is not limited to, the possible combinations of different cache, processors, other storage, and mismatch between the servers of the server system. Being an array, the hardware configuration lookup table may replace computation of possible configurations by the processors, which may limit I/O operations, making the operation faster. The hardware configuration lookup table 132 may be precalculated and stored in static storage or calculated as part of the conversion application 130 initialization, for example.

In operation 330, the conversion application 130 may create the conversion history file 134. The conversion history file 134 may be the current configuration, i.e., 4 processor cores and 64 GB of cache, of the server undergoing conversion, which may include the current physical hardware configuration and the current logical hardware configuration. It may also include the selected physical and logical hardware configurations for the server system 100 conversion. The conversion history file 134 may be used during a retry due to a failure during the server system 100 conversion. The conversion application 130 may setup the conversion configuration again from reading the conversion history file 134. This can be seen in operation 335. Referring back to operation 315, if in operation 315 the machine status of the first server is a retry, then, in operation 335, the conversion application 130 may use the conversion history file 134 to get the setup the desired conversion. The conversion history file 134 may be used to avoid the extra steps of operations 320-330.

Once either operation 330 or operation 335 is performed, then, in operation 340, the conversion application 130 may determine whether any physical hardware needs to be installed or removed to complete the conversion. In the given example 12 processor cores and 456 GB of cache need to be additionally installed. If no physical hardware needs to be installed, then the method may continue at operation 350 in FIG. 3B. If physical hardware needs to be installed, then, in operation 345, all of the physical hardware may be installed or some of the physical hardware may be installed in the first server 101A. Again, the physical hardware installed may include cache, processor cores, or other memory, for example.

Figure 3B:
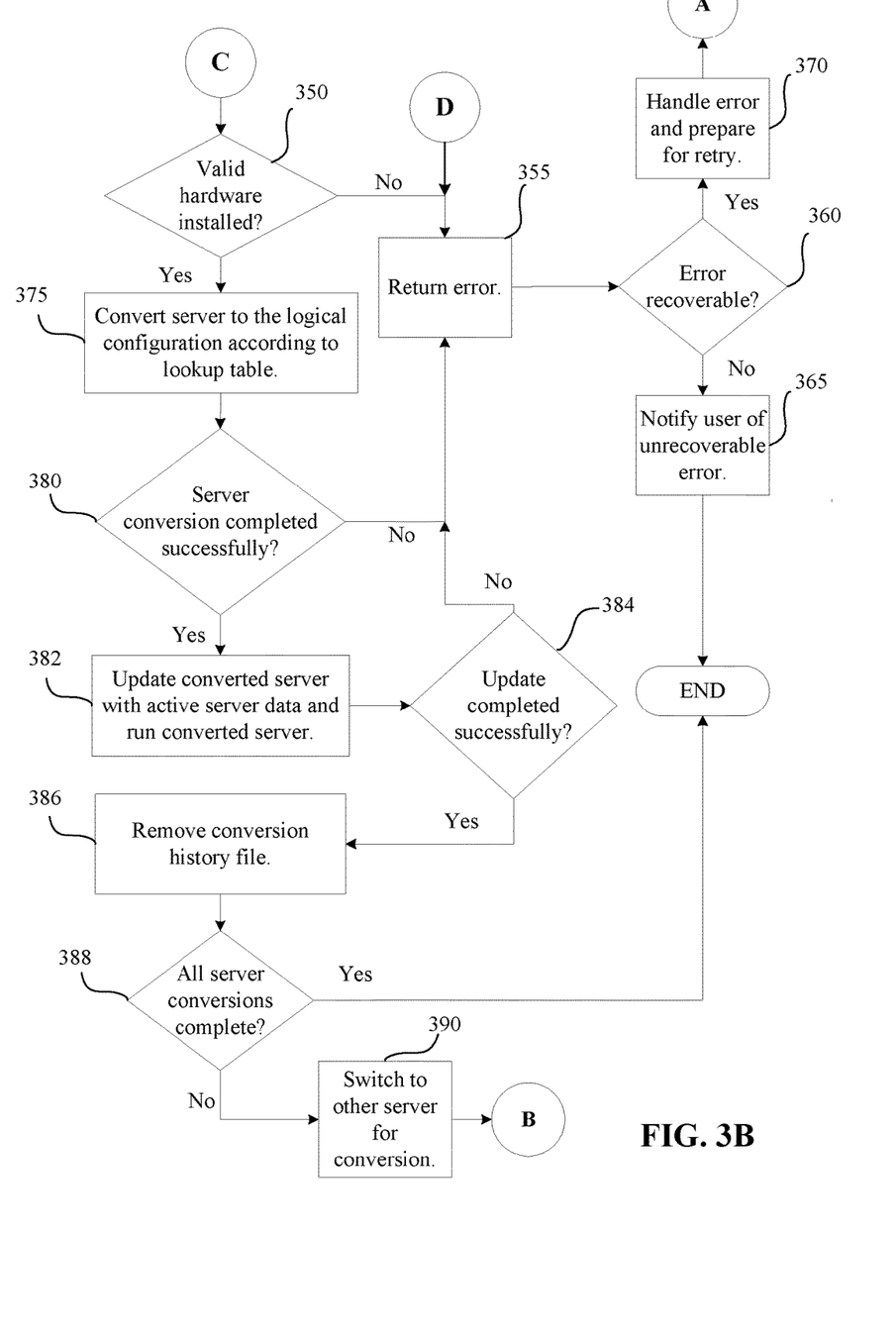

Following flow chart connector C of FIG. 3A to flow chart connector C of FIG. 3B, method 300 continues at operation 350 of FIG. 3B. In operation 350, the conversion application 130 may verify that the hardware physically installed is a valid configuration by comparing it to valid configurations within the hardware configuration lookup table 132. If the physical hardware is not valid, then, in operation 355, an error may be returned to the user. In operation 360, the conversion application 130 may determine whether the error is recoverable. If the error is not recoverable, then, in operation 365, the conversion application 130 may notify the user that the error is unrecoverable and the method 300 may end. If the error is recoverable, then, in operation 370, the error may be corrected and the conversion may prepare for retry. The method may then continue back to operation 305 of FIG. 3A. An example of an error may be the incorrect physical hardware configuration compared to the initial selected physical hardware configuration. The error may be corrected by installing the required physical hardware configuration.

Returning to operation 350, if the physical hardware installed is valid, then, in operation 375, the conversion on the first server may be performed. The logical hardware configuration may be converted to the allowed logical hardware configuration determined by the hardware conversion lookup table 132. The logical hardware configuration may not be the same as the physical hardware configuration after the initial conversion. For example, the first server may only be able to upgrade to 8 processor cores and 128 GB of cache before there is too much mismatch. The conversion application 130 may monitor the server conversion of the logical hardware configuration. In operation 380, if the conversion of the logical hardware configuration did not complete successfully, then the conversion application 130 may return an error in operation 355. If the conversion of the logical hardware configuration completed successfully, then, in operation 382, the first server that was converted may be updated with the data of the second server, which was still providing network services, so that their redundancy is restored. In operation 384, if the update of data did not complete successfully, then the method 300 may return an error in 355. If the update of data did complete successfully, then, in operation 386, the conversion history file 134 may be removed. In operation 388, the conversion application 130 may determine whether all of the server conversions have completed, i.e. both servers are at the logical configuration of 16 processor cores and 512 GB of cache. If they have all completed, then the method 300 may end. If the server conversions have not completed, then, in operation 390, the conversion application 130 may switch the server conversion to the second server and the first server may remain active. The method may return to operation 305.

Referring back to FIG. 2, the computer programs include one or more instructions or statements that are resident at various times in various memory and storage devices in the server 101. When the computer programs are read and executed by one or more processors in the server 101, or when interpreted by instructions that are executed by one or more processors, the computer programs cause the server 101 to perform the actions necessary to execute steps or elements including the various aspects of embodiments. Aspects of embodiments may be embodied as a system, method, or computer program product. Accordingly, aspects of embodiments may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in specific embodiments. But, any particular program nomenclature used herein is used merely for convenience, and thus embodiments are not limited to use solely in any specific application identified and/or implied by such nomenclature. The exemplary environments illustrated in FIG. 2 are not intended to limit embodiments. Indeed, other alternative hardware and/or program environments may be used without departing from the scope of embodiments.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments, reference was made to the accompanying drawings, which form a part hereof, and in which is shown by way of illustration specific exemplary embodiments in which the embodiments may be practiced. These embodiments were described in sufficient detail to enable those skilled in the art to practice the embodiments, but other embodiments may be utilized and logical, mechanical, electrical, and other changes may be made without departing from the scope of the embodiments. In the previous description, numerous specific details were set forth to provide a thorough understanding of embodiments. But, embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method of upgrading hardware on a server system of two or more servers comprising:
    entering a server conversion of a first server while a second server performs one or more network services;
    verifying a current physical hardware configuration and logical hardware configuration of a first server and a second server;
    calculating possible conversions of one or more valid logical hardware configurations and one or more valid physical hardware configurations based on the current hardware configurations of the first server and the second server, wherein the calculating possible conversions of one or more valid logical hardware configurations is further based on allowable mismatches between logical hardware configurations of the first server and the second server;
selecting a valid physical hardware configuration for both servers from the calculated possible conversions;
installing all physical hardware for the conversion of the physical hardware configuration of the first server to the selected valid physical hardware configuration; and
converting the current logical configuration of the first server to a valid logical hardware configuration based on the calculated possible conversions, wherein the valid logical hardware configuration uses less hardware than the selected valid physical hardware configuration.

2. The method of claim 1, further comprising:
updating the first server with the data on the second server so that they are redundant;
entering the server conversion of the second server while the first server performs one or more network services;
updating physical hardware for the conversion of the physical hardware configuration of the second server;
converting the current logical configuration of the second server to a valid logical hardware configuration based on the calculated possible conversions; and
updating the second server with the data on the first server so that the first and second servers are redundant.

3. The method of claim 1, further comprising:
creating a conversion history file of the current logical hardware configuration of the first server and the selected physical hardware configuration before the conversion of the current logical hardware configuration.

4. The method of claim 3, further comprising:
removing the conversion history file of the first server when the conversion of the first server is completed.

5. The method of claim 3, further comprising:
detecting an error in the conversion of the first server, wherein the error is an incorrect physical hardware configuration when compared to the selected valid physical hardware configuration;
correcting the error in the conversion of the first server by installing physical hardware; and
retrying the conversion of the first server from the logical hardware configuration set by the conversion history file.

6. The method of claim 1, wherein a hardware configuration lookup table is used to calculate possible upgrade of one or more valid logical hardware configurations and one or more valid physical hardware configurations.

7. The method of claim 1, wherein the physical hardware installed on the first server is all of the physical hardware of the selected physical hardware configuration.

8. The method of claim 1, further comprising:
detecting an error in the conversion of the first server;
correcting the error in the conversion of the first server; and
retrying the conversion of the first server from a logical hardware configuration set by a conversion history file.

9. A computer program product comprising a non-transitory computer readable storage medium having program instructions embodied therewith, the program instructions executable by a processor to cause the processor to perform a method comprising:
entering a server conversion of a first server while a second server performs one or more network services;
verifying a current physical hardware configuration and logical hardware configuration of a first server and a second server;
calculating possible conversions of one or more valid logical hardware configurations and one or more valid physical hardware configurations based on the current hardware configurations of the first server and the second server, wherein the calculating possible conversions of one or more valid logical hardware configurations is further based on allowable mismatches between logical hardware configurations of the first server and the second server;
selecting a valid physical hardware configuration for both servers from the calculated possible conversions;
installing all physical hardware for the conversion of the physical hardware configuration of the first server to the selected valid physical hardware configuration; and
converting the current logical configuration of the first server to a valid logical hardware configuration based on the calculated possible conversions, wherein the valid logical hardware configuration uses less hardware than the selected valid physical hardware configuration.

10. The computer program product of claim 9, wherein the method further comprises:
updating, after the converting the current logical configuration of the first server to the valid logical hardware configuration, the first server with the data on the second server so that they are redundant;
entering, after the updating the first server with the data on the second server, the server conversion of the second server while the first server performs one or more network services;
installing all physical hardware for the conversion of the physical hardware configuration of the second server to the selected valid physical hardware configuration;
converting the current logical configuration of the second server to the valid logical hardware configuration based on the calculated possible conversions; and
updating, after the converting the current logical configuration of the second server, the second server with the data on the first server so that the first and second servers are redundant.

11. The computer program product of claim 10, wherein the method further comprises:
entering a second server conversion of the first server while the second server performs one or more network services; and
converting, during the second server conversion, the valid logical hardware configuration of the first server to a second valid logical hardware configuration, where the second valid logical hardware configuration uses all of the hardware in the selected valid physical hardware configuration.

12. The computer program product of claim 9, wherein the method further comprises:
creating a conversion history file of the current logical hardware configuration of the first server and the selected physical hardware configuration before the conversion of the current logical hardware configuration.

13. The computer program product of claim 12, wherein the method further comprises:
removing the conversion history file of the first server in response to completion of the conversion of the first server.

14. The computer program product of claim 9, wherein a hardware configuration lookup table is used to calculate possible upgrade of one or more valid logical hardware configurations and one or more valid physical hardware configurations.

15. A computer comprising:
- a processor; and
- memory communicatively coupled to the processor, wherein the memory is encoded with instructions, and wherein the processor is configured to execute the instructions to perform a method comprising:
- entering a server conversion of a first server while a second server performs one or more network services;
- verifying a current physical hardware configuration and logical hardware configuration of a first server and a second server;
- calculating possible conversions of one or more valid logical hardware configurations and one or more valid physical hardware configurations based on the current hardware configurations of the first server and the second server, wherein the calculating possible conversions of one or more valid logical hardware configurations is further based on allowable mismatches between logical hardware configurations of the first server and the second server;
- selecting a valid physical hardware configuration for both servers from the calculated possible conversions;
- installing all physical hardware for the conversion of the physical hardware configuration of the first server; and
- converting the current logical configuration of the first server to a valid logical hardware configuration based on the calculated possible conversions, wherein the valid logical hardware configuration uses less hardware than the selected valid physical hardware configuration.

16. The computer of claim 15, wherein the method further comprises:
- updating the first server with the data on the second server so that they are redundant;
- entering the server conversion of the second server while the first server performs one or more network services;
- updating physical hardware for the conversion of the physical hardware configuration of the second server;
- converting the current logical configuration of the second server to a valid logical hardware configuration based on the calculated possible conversions; and
- updating the second server with the data on the first server so that the first and second servers are redundant.

17. The computer of claim 15, wherein the method further comprises:
- creating a conversion history file of the current logical hardware configuration of the first server and the selected physical hardware configuration before the conversion of the current logical hardware configuration.

18. The computer of claim 17, wherein the method further comprises:
- removing the conversion history file of the first server when the conversion of the first server is completed.

19. The computer of claim 15, wherein a hardware configuration lookup table is used to calculate possible upgrade of one or more valid logical hardware configurations and one or more valid physical hardware configurations.

* * * * *